United States Patent [19]
Newman
[11] 3,857,420
[45] Dec. 31, 1974

[54] CIRCUIT MODULE LEAD FORMING MACHINE

[75] Inventor: Reginald F. Newman, Sherman Oaks, Calif.
[73] Assignee: Electronic Memories & Magnetics Corporation, Los Angeles, Calif.

[22] Filed: Nov. 6, 1972
[21] Appl. No.: 304,041

[52] U.S. Cl. ........ 140/71 R, 29/203 D, 72/DIG. 10, 72/DIG. 11, 72/332, 72/338, 72/389, 72/424, 140/1, 140/105, 140/140, 209/73, 209/81, 221/105, 221/224
[51] Int. Cl. .......... B21f 45/00
[58] Field of Search ......... 140/1, 105, 140, 147, 71; 72/DIG. 10, DIG. 11, 326, 331, 332, 338, 384, 294, 389, 424; 221/105, 210, 224, 225, 294, 235, 239, 270; 29/203 D, 203 P; 209/73, 74, 81

[56] References Cited

UNITED STATES PATENTS

| | | | |
|---|---|---|---|
| 2,713,362 | 7/1955 | Stahl | 140/71 R |
| 2,713,878 | 7/1955 | Stahl | 140/71 R |
| 2,878,475 | 3/1959 | Zimmerman | 140/71 R |
| 3,034,382 | 5/1962 | Hazel | 72/331 X |
| 3,193,171 | 7/1965 | Johnson et al. | 140/105 X |
| 3,593,404 | 7/1971 | Ragard | 29/203 D X |
| 3,722,060 | 3/1973 | Gaiser | 29/203 D |
| 3,727,757 | 4/1973 | Boissicat | 221/105 X |

*Primary Examiner*—C. W. Lanham
*Assistant Examiner*—Joseph A. Walkowski
*Attorney, Agent, or Firm*—Lindenberg, Freilich, Wasserman, Rosen & Fernandez

[57] ABSTRACT

A machine for rapidly bending the leads of dual-in-line circuit modules and trimming them to length, including a vertical guideway for the free fall of a stack of circuit modules, a series of fingers for alternately holding the modules and releasing the bottommost module, and a forming tool that bends and trims the leads. The forming apparatus includes a die with a rear face narrower than the separation of the leads on either side thereof, and a pair of blades that bend the leads in a free curve extending from the module body to the opposite edges of the die to set the leads to a new orientation and trim them to length. The modules are advanced downwardly past the die by three fingers, including upper and lower fingers that alternately hold the stack from falling so that the stack moves down by a distance of one module length at a time, and a middle finger that alternately presses a module against the die and releases it to fall away.

5 Claims, 7 Drawing Figures

CIRCUIT MODULE LEAD FORMING MACHINE

BACKGROUND OF THE INVENTION

This invention relates to methods and apparatus for forming the leads of circuit modules, and especially for forming the leads of dual-in-line modules.

Dual-in-line circuit modules have leads that initially extend from opposite sides of the body and which are bent so they gradually spread away from each other. The modules are generally supplied by the manufacturer with long leads that extend at a large spread angle, and which must be trimmed to a predetermined length and bent closer together so they extend parallel or at a smaller spread angle. In the mass production of equipment utilizing dual-in-line circuit modules, large numbers of identical modules must be bent and trimmed identically. A relatively simple machine that could rapidly and automatically perform the required forming operation would have great utility in such mass production manufacturing.

SUMMARY OF THE INVENTION

In accordance with one embodiment of the present invention, a simple apparatus is provided for the mass production forming of the leads of dual-in-line circuit modules. The apparatus includes a die with a face that is much narrower than the distance between the module leads on either side thereof, and a pair of blades that bend the leads against the opposite die edges to trim them thereat and to bend the leads past their elastic limit which results in the leads extending at a smaller spread angle.

The circuit modules are rapidly moved across the die by three fingers that control the free fall of the modules. The modules are arranged in a vertical stack, with a bottommost module held against the die by a middle finger, and with a next to bottommost, or penultimate module held in position by an uppermost finger. After the leads are trimmed on the bottommost module, the middle finger is moved away from that module to allow it to fall away from the stack. A lowermost finger is then moved under the remaining stack of modules and the uppermost finger is released, to allow the entire stack to fall down to the lowermost finger. Thus, the modules are rapidly advanced past the die by gravity.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
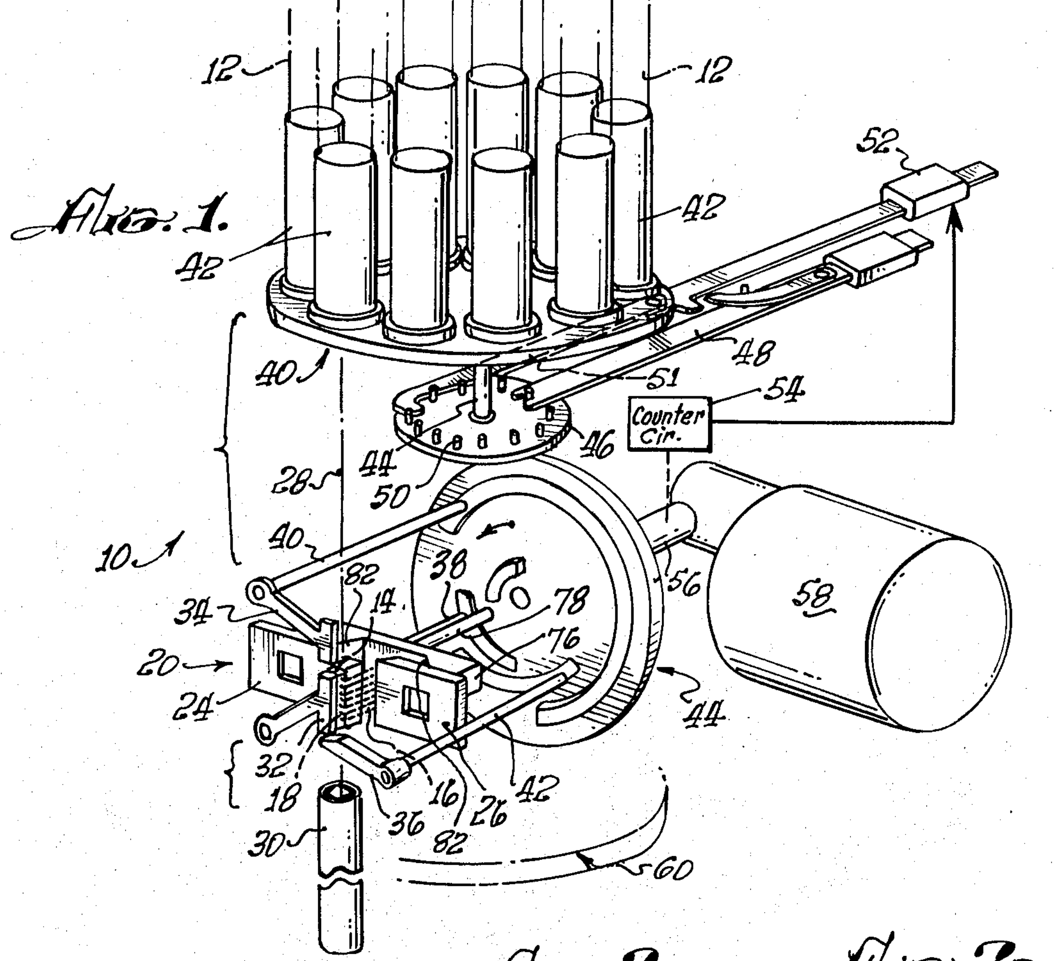
FIG. 1 is a partial perspective view of a lead forming machine constructed in accordance with the invention.

FIG. 1 illustrates many of the operating parts of a machine 10 which receives supply tubes 12 containing circuit modules 14, and which forms the leads 16 which extend from the body 18 of the modules. The leads are formed by bending them so they will extend at predetermined orientations from the body and by cutting them to a predetermined length. The machine has forming apparatus 20 including a die 22 and a pair of forming tools or blades 24, 26 that bend the leads against a face of the die and sever them thereat. The modules are rapidly fed past the die 22 by allowing them to freely fall along a substantially vertical path 28 extending from the supply tubes 12 to collector tubes 30 that receive the formed modules.

The movement of the modules along the vertical path 28 is controlled by three fingers 32, 34, and 36 arranged along the vertical module path. Each of the fingers has a rod 38, 40, 42 driven by a cam 44 that oscillates the fingers toward and away from the module path. A first or middle finger 32 can hold the body of a module against the die 22 while the blades 24, 26 form the module leads. After the leads of the module are formed, the fingers are moved to release only the bottommost module that has been formed so it falls into the receiving tube 30, and then the stack of modules thereabove are allowed to free fall so that the next module drops to a position adjacent to the die 22 so that its leads can be formed.

Figure 2A:
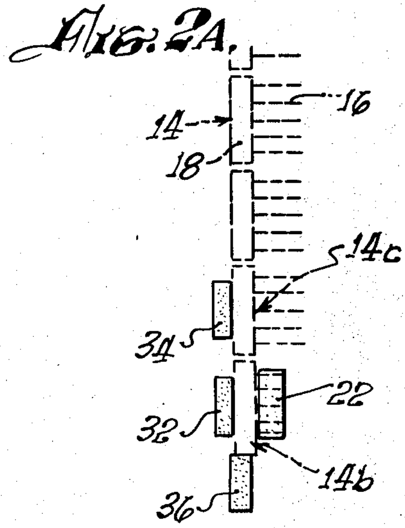
FIG. 2A is a simplified side elevation view of a portion of the machine of FIG. 1, shown in a first portion of a cycle of operation.
Figure 2B:
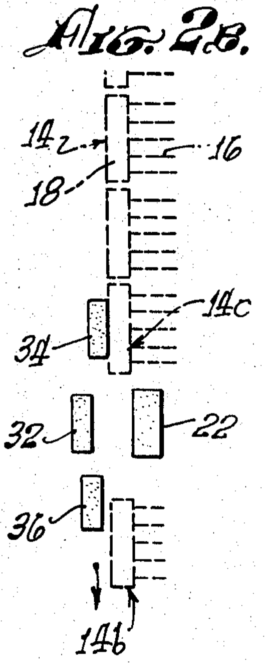
FIG. 2B is a view of the apparatus of FIG. 2A at a later time in the cycle of operation.
Figure 2C:
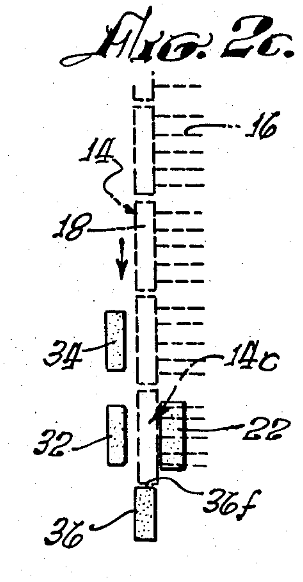
FIG. 2C is a view of the apparatus of FIG. 2B at a later time in the cycle of operation.

FIGS. 2A, 2B and 2C illustrate the sequence of operation by which the modules are fed past the die 22. In FIG. 2A, which illustrates the machine at the beginning of a cycle of operation, the first or middle finger 32 is pressing the bottommost module 14*b* against the die 22 at which the module leads have been formed. At this time, a second or upper finger 34 is pressing against the next-to-bottommost, or penultimate, module 14*c* to frictionally clamp it and prevent it from falling down. Also, a third or lowermost finger 36 lies under the stack of modules. In FIG. 2B, which illustrates a next stage in the cycle, the middle finger 32 and lower finger 36 have been moved away from the path of the modules, to release the bottommost module 14*b* and allow it to drop down so it falls into the receiving tube. The upper finger 34, however, continues to hold the penultimate module 14*c* against falling. FIG. 2C illustrates a next stage of the process, wherein the lower finger 36 is moved into the module path so its upper face 36*f* can support the modules, while the upper finger 34 is moved away from the path to release the stack of modules. The stack of modules falls until the module 14*c* reaches a position adjacent to the die 22. The middle and upper fingers 32, 34 are then moved back to positions against modules located along the module path, to the positions shown in FIG. 2A, and the blades then form the leads of the module which lies adjacent to the die. Thus, sequential feeding of the modules is obtained by merely oscillating three fingers to control the manner in which gravity drops the modules through the machine.

The machine 10 permits modules to be formed at a high production rate, with only occasional attention from a human operator. A main duty of the operator is to keep the machine supplied with modules that are to be formed and to take away modules that have been formed. The long tubes 12 in which the modules are packaged contain many modules, so that it would be possible to merely mount a tube over the vertical module path 28 and replace it after all of the modules have passed out of it. However, although the machine is relatively simple, it is able to form modules at a rapid rate, such as two modules per second, so that replacement of one tube at a time would require almost constant operator attention.

In order to reduce operator attention and stoppage of the machine, the machine is provided with a feed turret 40 that can hold ten tubes 12 and sequentially position them over the vertical module path 28. The turret has ten tube holders 42 that readily receive the supply tubes 12 that hold circuit modules. The turret is fixed to a shaft 44 whose lower end is fixed to an indexing plate 46. The indexing plate is retained at each of its ten positions by engagement of a slideable latch 48 with one of the indexing pins 50 on the plate. The plate is indexed to a new position every time a pawl 51 is drawn back by an electromagnet 52. A pair of springs (not shown) return the pawl 51 and latch 48 to their original positions after each indexing. Energization of the electromagnet 52 to index the turret is obtained from a counter circuit 54 that counts the number of modules that have been formed. After a predetermined number of modules have been formed, which is approximately equal to the number of modules contained in each of the supply tubes 12, the circuit 54 sends a pulse to the electromagnet 52 to energize it. The counter 54 is mechanically coupled to the output shaft 56 of a motor 58 that drives the cam 44.

An operator readies the machine for forming modules by installing ten supply tubes 12 in the turret. He then starts the machine and can leave it unattended for awhile. The operator returns after the modules in most of the supply tubes have been formed, and he then removes the empty supply tubes and replaces them with other supply tubes whose modules are to be formed. Although the formed modules could be allowed to fall into a collecting basket, it is generally preferable to collect them in the receiving tubes 30. The receiving tubes 30 are mounted on a receiving turret 60 that can hold many other similar receiving tubes and which is indexed in the same manner as the supply turret 40 by a similar mechanism (not shown). When receiving tubes are utilized, the operator also must replace the filled receiving tubes with empty ones. The modules can be formed at a rapid rate even though there is a short interruption of module feeding when the turret is indexed. This is because there are always a plurality of modules above the module being formed, so that any brief interruption in the feeding of modules into the top of the stack does not affect the supplying of modules at the die and forming tool.

Figures 3, 4, 5:
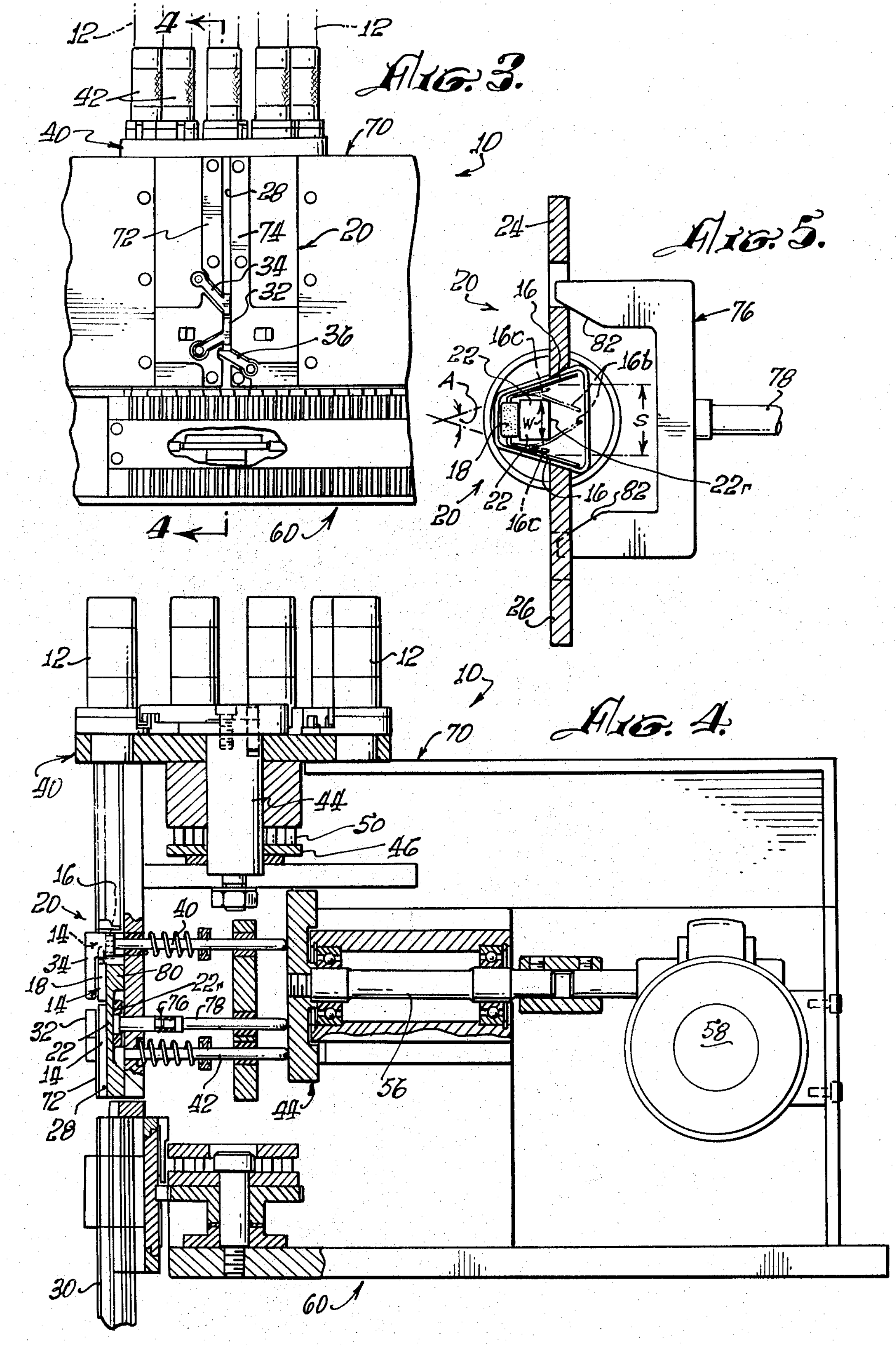
FIG. 3 is a front elevation view of the machine of FIG. 1.
FIG. 4 is a view taken on the line 4—4 of FIG. 3.
FIG. 5 is a partial plan view of the apparatus of FIG. 1, showing the manner in which circuit module leads are formed by the die and blade apparatus of the invention.

FIGS. 3–5 illustrate details of the machine, showing the housing 70 thereof which includes a pair of guide members 72, 74 that define the vertical guideway or path 28 of the modules 14. The forming apparatus 20 which bends and trims the circuit module leads includes an activating member 76 (FIG. 5) which slides the two blades 24, 26 towards the die 22 at proper times during the cycle of operation. The activating member or piston 76 is slideably mounted on the frame and has a rod portion 78 that extends to the cam 44 and is activated by it. The two blades 24, 26 are slideably mounted in blade guides 80 that confine them to slideable motion. A pair of springs (not shown) urge the blades away from the die 22, while beveled surfaces 82 on the activating member push the blades towards the die when the activating member moves forward. When the activating member 76 moves forward, the blades contact the leads 16 on the circuit module and bend them against the rear face 22r of the die. The blades continue moving together so they slide a small distance along the rear face of the die and sever the ends of the leads to trim them to shape.

The forming apparatus 20 not only trims the leads, but simultaneously deforms them to a predetermined orientation with respect to the body 18 of the module. The leads 16 are originally supplied so that they spread apart at a large angle A such as 30°. The leads often must be deformed to a different angle of spreading in order for them to readily fit into a particular circuit wherein holes provided for the leads are spaced a predetermined distance apart. The width W of the rear die face, against which the blades pass, is chosen to produce a predetermined amount of module lead deforming. The width W of the die is considerably narrower than the original spacing S between the leads at locations even with the shearing face 22r of the die, generally being at least 10 percent smaller. When the blades 24, 26 bend the leads against the edges of the shearing face 22r of the die, the leads are unsupported in extension between the body 18 of the module and the shearing locations at the die edges, or in other words they extend in a free curve therebetween. As a result, the leads are deformed considerably, to the positions 16*b*, in reaching the die. After the leads are trimmed, they spring back partially towards their initial positions. However, the deformation to the orientations at 16*b* is sufficient to create a permanent set in the leads so that they spring back only to the orientations indicated at 16*c*. Thus, the angle of spreading apart of the leads is decreased at the same time that the leads are trimmed to length, using a relatively inexpensive die 22.

Thus, the invention provides a relatively simple forming machine for use with circuit modules to form the leads of the modules. The apparatus rapidly feeds the modules past the forming tool, using gravity to move the modules and utilizing three cyclically moved fingers that alternately hold and release the modules to downwardly advance the modules past the forming tool. The fingers include upper and lower fingers that alternately engage adjacent modules, the lower finger alternately moving under the stack to support it against further free fall, and the upper finger alternately moving sidewardly against the penultimate module to clamp it against falling when the bottommost module is released. A minimum of operator attention is required, because a stack of several modules is provided together with turret apparatus that automatically changes the supply tubes without constant operator attention. The leads are formed by moving a pair of blades against the leads and deflecting the leads against a narrow die. The forming apparatus not only trims the leads, but deforms them past their elastic limits so that they spring back to a new orientation that is required in order to permit mounting of the modules in a particular circuit holder.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. Apparatus for forming circuit modules that each includes a body and a plurality of leads extending therefrom, comprising:

means defining a primarily vertically extending guideway for the modules;

a die positioned along said guideway;

a forming tool mounted for movement against and away from the die;

a middle finger means positioned along the guideway substantially at the level of said die and cyclically moveable between holding and release positions respectively against and away from a module, to alternately hold the module at a first module position wherein the leads thereof extend across the die, or to release the module so it can fall along the guideway;

an upper finger means positioned along the guideway above the middle finger means and cyclically moveable between holding and release positions respectively against and away from a module at a second position above said first module position, to alternately hold or release the module;

a lower finger means with a module-supporting upper part, said lower finger means positioned along the guideway below the middle finger means and cyclically moveable between hold and release positions respectively into and out of the path of modules moving along the guideway, to alternately stop the fall of the modules therealong or to release them to fall therealong; and means operable in each cycle for moving said middle and lower finger means to their release positions while maintaining said upper finger means in its holding position to thereby drop a module with formed leads, for then moving said lower finger means to its holding position and moving the upper finger means to the release position while maintaining the middle finger means in a release position to thereby drop a new module to the level of the die, and for then moving the middle finger means to its holding position to hold the module in place and for moving the forming tool against the die to form the leads.

2. The apparatus described in claim 1 including:

a turret rotatably mounted at the top of the guideway, said turret having a plurality of tube-holding means for receiving elongated tubes of circuit modules; and means responsive to said moving means for indexing said turret; and wherein said guideway includes an upper portion between the bottom of the tubes and the position of a module held by the upper finger means, which is long enough to hold a plurality of said modules, whereby to permit rapid forming of the modules without interruption.

3. The apparatus described in claim 1 wherein:

the leads of each module extend from opposite sides of the body of the module so that the leads spread away from each other at approximately a predetermined angle prior to forming of the leads;

said die has a front face adjacent to the module body and a rear face furthest from the module body, the rear face having a width less than the separation of the leads on either side thereof; and said forming tool includes a pair of slideably mounted blades moveable against and partially across the opposite sides of the rear face of the die, to deform the leads together and cut them off, whereby to simultaneously change the angle of spreading of the leads and trim them to length.

4. The apparatus described in claim 1 wherein:

said forming tool includes a pair of slideably mounted blades moveable against and away from the die; and including a piston slideably mounted along an axis perpendicular to the sliding direction of said blades and coupled to said blades to move them; and three finger-actuating rods slideably mounted along axes parallel to the axis of sliding of the tool-actuating piston, each having a front end fixed to a different one of said finger means and a rear end; and wherein said moving means includes a cam having a plurality of cam surfaces respectively engaged with said piston and the rear ends of said rods to move them, and a motor connected to said cam to drive it.

5. A method for forming the leads of circuit modules that each include a body with opposite sides and leads extending from the opposite sides of the body, comprising holding a circuit module against a die apparatus;

slideably holding a plurality of said modules in a vertical stack above said die apparatus so they are free to fall when the bottommost module is released;

moving a middle finger between hold and release positions wherein it respectively holds the bottommost module against said die apparatus and releases the module to fall away from the die apparatus and stack;

maintaining an upper finger in a hold position above the die apparatus and against a penultimate module of the stack to prevent its free fall until a time after the middle finger moves to its release position, then moving the upper finger to a release position to permit free fall of the stack of modules, and then moving the upper finger back to its hold position; and maintaining a lower finger in a hold position beneath the die apparatus and beneath the stack of modules when both said first and second fingers are in their release positions, and maintaining the lower finger in a release position out of the downward path of the modules at a time when the middle finger is in its release position and the upper finger is in its hold position to permit the bottommost module to fall away from the stack.

* * * * *